United States Patent
Lee et al.

(10) Patent No.: US 9,430,374 B2
(45) Date of Patent: Aug. 30, 2016

(54) NON-VOLATILE MEMORY SYSTEM AND HOST CONFIGURED TO COMMUNICATE WITH THE SAME

(71) Applicant: SAMSUNG ELECTRONICS CO., LTD., Suwon-si, Gyeonggi-do (KR)

(72) Inventors: Jong-Won Lee, Seoul (KR); Woo-Young Yang, Suwon-Si (KR); Han-Deok Lee, Yongin-Si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 327 days.

(21) Appl. No.: 14/068,831

(22) Filed: Oct. 31, 2013

(65) Prior Publication Data
US 2014/0129760 A1    May 8, 2014

(30) Foreign Application Priority Data
Nov. 2, 2012    (KR) .......................... 10-2012-0123748

(51) Int. Cl.
*G06F 12/00* (2006.01)
*G06F 12/02* (2006.01)
*G06F 3/06* (2006.01)
*G06F 12/10* (2016.01)

(52) U.S. Cl.
CPC ......... *G06F 12/0246* (2013.01); *G06F 3/0611* (2013.01); *G06F 3/0638* (2013.01); *G06F 3/0679* (2013.01); *G06F 12/10* (2013.01); *G06F 2212/7201* (2013.01)

(58) Field of Classification Search
CPC ....................... G06F 2212/7201; G06F 12/10
See application file for complete search history.

(56) References Cited

U.S. PATENT DOCUMENTS

| | | | |
|---|---|---|---|
| 7,979,616 B2 | 7/2011 | Bravo et al. | |
| 8,156,305 B1 | 4/2012 | Goodson et al. | |
| 2005/0055532 A1 | 3/2005 | Yu | |
| 2009/0292865 A1 | 11/2009 | Hong | |
| 2010/0023800 A1* | 1/2010 | Harari ................. | G06F 11/1068 714/2 |
| 2010/0161886 A1 | 6/2010 | Toelkes et al. | |
| 2011/0161554 A1 | 6/2011 | Selinger et al. | |
| 2012/0066443 A1 | 3/2012 | Li et al. | |
| 2014/0082323 A1* | 3/2014 | Li .......................... | G06F 12/10 711/207 |

FOREIGN PATENT DOCUMENTS

JP    2009-258911    11/2009

OTHER PUBLICATIONS

English Abstract for Publication No: 2009-258911, Nov. 5, 2009.

* cited by examiner

*Primary Examiner* — Zachary K Huson
(74) *Attorney, Agent, or Firm* — F. Chau & Associates, LLC

(57) ABSTRACT

A nonvolatile memory system includes a memory controller for copying a mapping data group including logical-physical address mapping information regarding user data from a nonvolatile memory to a mapping information storage unit, and transmit size information regarding the mapping data group to a host. The host may receive size information regarding the mapping data group from the nonvolatile memory system, and determine the order of commands to be transmitted to the nonvolatile memory based on the size information regarding the mapping data group.

20 Claims, 10 Drawing Sheets

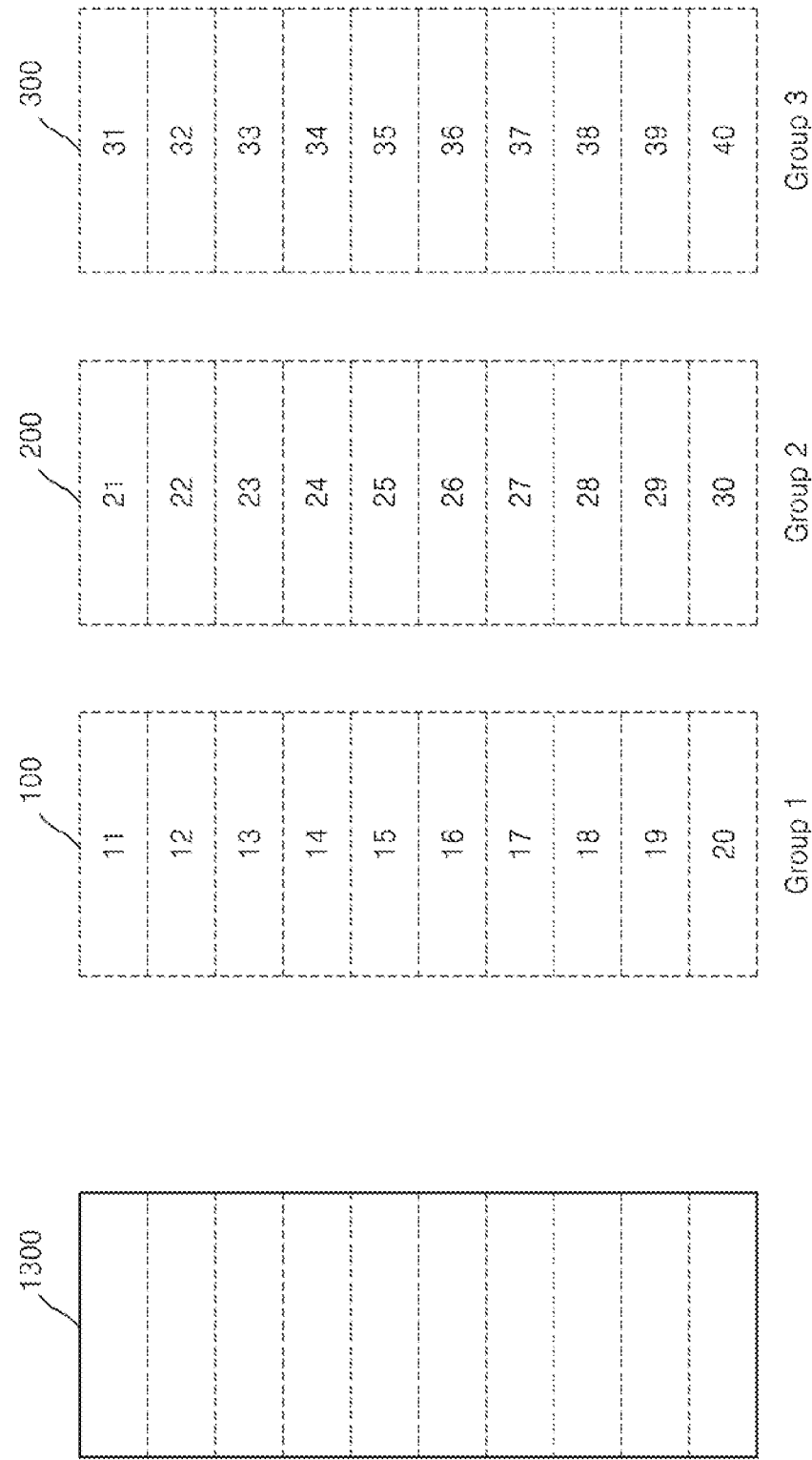

NON-VOLATILE MEMORY SYSTEM AND HOST CONFIGURED TO COMMUNICATE WITH THE SAME

CROSS-REFERENCE TO RELATED APPLICATIONS

This application claims the benefit of Korean Patent Application No. 10-2012-0123748, filed on Nov. 2, 2012, in the Korean Intellectual Property Office, the disclosure of which is incorporated by reference herein in its entirety.

TECHNICAL FIELD

The inventive concept relates to a memory system, and more particularly, to a non-volatile memory system and a host configured to communicate with the non-volatile memory system.

DISCUSSION OF THE RELATED ART

A data storage device, which may retain data stored therein even if power supply is interrupted, is referred to as a non-volatile memory. Examples of non-volatile memories may include a read-only memory (ROM), a magnetic disk, an optical disk, and a flash memory. Flash memories may be configured to store data by creating a variation in threshold voltage of a MOS transistor. Examples of such flash memories may include a NAND flash memory and a NOR flash memory.

A non-volatile memory system may be a device including a non-volatile memory or a device including a non-volatile memory and a memory controller. A host or a host device may communicate with the non-volatile memory system and command the non-volatile memory system to write or read data. Due to structural characteristics of the non-volatile memory, the memory controller may perform an operation, which is not recognized by the host. As a result, speed at which the non-volatile memory system responds to a command from the host may be reduced.

SUMMARY

The inventive concept provides a non-volatile memory system and a host configured to communicate with the non-volatile memory system. A speed at which the non-volatile memory system responds to a command from the host may be increased.

According to an aspect of the inventive concept, a non-volatile memory system includes a non-volatile memory configured to store user data and a plurality of mapping data groups, each group including mapping information for mapping between a logical address and a physical address of the data. A mapping information storage unit is configured to store at least one of the mapping data groups. A memory controller is configured to transmit size information regarding the size of the mapping data groups to an external host and copy a requested mapping data group, of the plurality of mapping data groups, including mapping information regarding user data requested by the host to be accessed, from the nonvolatile memory to the mapping information storage unit.

Each of the plurality of mapping data groups may include mapping information corresponding to a predetermined number of logical addresses that may sequentially increase.

The memory controller may receive a command packet including a plurality of commands to access a plurality of requested user data, from the host, and provides access to the plurality of requested user data according to an order of the commands included in the command packet.

The memory controller may scramble or otherwise encrypt the size information regarding the requested mapping data group and transmit the scrambled or otherwise encrypted size information to the host.

The memory controller may receive a command to change the size of the mapping data group, from the host, and change the size of the requested mapping data group copied from the nonvolatile memory to the mapping information storage unit.

According to an aspect of the inventive concept, a host system includes an interface unit configured to communicate with a nonvolatile memory system. The nonvolatile memory system is configured to store a plurality of mapping data groups including mapping information for mapping between logical addresses of user data and physical addresses of the user data. The host system includes a command output unit configured to output at least one command to access the user data, and a command packet generating unit configured to receive a plurality of commands from the command output unit. The command packet generating unit is additionally configured to determine the order of a plurality of commands based on size information regarding the plurality of mapping data groups to generate a command packet, and transmit the command packet to the nonvolatile memory system via the interface unit.

The mapping information group may include mapping information corresponding to a predetermined number of logical addresses that may sequentially increase.

The command packet generating unit may determine the order of commands belonging to the command packet such that user data corresponding to logical addresses belonging to the same mapping data group are sequentially accessed.

The command output unit may output a command to change the size of the mapping data group of the nonvolatile memory system.

BRIEF DESCRIPTION OF THE DRAWINGS

Exemplary embodiments of the inventive concept will be more clearly understood from the following detailed description taken in conjunction with the accompanying drawings in which:

FIG. 3 is a diagram of a mapping information storage unit and mapping information groups according to exemplary embodiments of the inventive concept;

DETAILED DESCRIPTION OF THE EMBODIMENTS

The inventive concept will now be described more fully hereinafter with reference to the accompanying drawings, in which exemplary embodiments of the inventive concept are shown. This inventive concept may, however, be embodied in different forms and should not be construed as limited to the embodiments set forth herein. Rather, these embodiments are provided so that this disclosure is thorough and complete and fully conveys the scope of the inventive concept to one skilled in the art.

Figure 1:
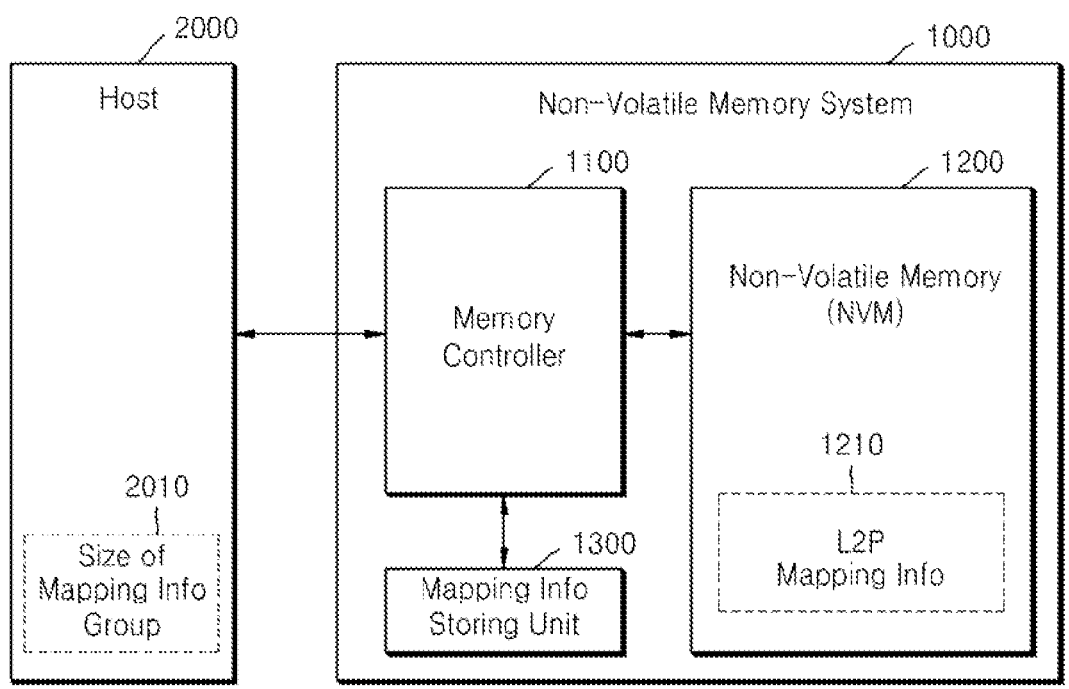
FIG. 1 is a diagram of a non-volatile memory system and a host configured to communicate with the non-volatile memory system according to exemplary embodiments of the inventive concept.

FIG. 1 is a diagram of a non-volatile memory system 1000 and a host 2000 configured to communicate with the non-volatile memory system according to exemplary embodiments of the inventive concept. The non-volatile memory system 1000 may include a memory controller 1100, a non-volatile memory 1200, and a mapping information storage unit 1300. The host 2000 may communicate with the non-volatile memory system 1000 and write or read data from the non-volatile memory system 1000. Also, the data written or read by the host 2000 may be defined as user data.

The non-volatile memory 1200 may further store logical-physical address mapping information or L2P mapping information (hereinafter, referred to as mapping information) 1210 regarding the non-volatile memory system 1000, along with user data. A logical address may be an address of user data recognized by the host 2000, and the host 2000 may designate the logical address instead of a physical address and may write or read user data. The physical address is an address of a space of the non-volatile memory 2000 in which the user data is actually stored. The physical address therefore refers to the original and native address within the physical non-volatile memory 2000 where the user data is stored. The memory controller 1100 may receive a command to access user data and the logical address from the host 2000 and write or read the user data in or from a space designated by the physical address corresponding to the logical address.

The non-volatile memory 1200 may retain stored data even when power supply is interrupted. Moreover, a NAND flash memory, which is an example of the non-volatile memory 1200, may perform data program and read operations in units of pages, but perform a data erase operation in units of blocks, each of which includes a plurality of pages. Accordingly, when the host 2000 intends to change user data stored in a space of the NAND flash memory that is designated by a specific address, the host 2000 may erase a block in which the user data is stored, and then program the user data to be changed.

The host 2000 may communicate with the non-volatile memory system 1000 including the non-volatile memory 1200 instead of directly communicating with the non-volatile memory 1200, and the non-volatile memory system 1000 may further include the memory controller 1100. Since it takes a relatively long time for the non-volatile memory 1200 to perform an erase operation, the memory controller 1100 included in the non-volatile memory system 1000 might not immediately erase a block in which conventional user data to be changed is stored, but might instead write new user data to be changed in a vacant space of the non-volatile memory 1200 in which data is not written, and store an address of a spot in which the new user data is stored. Accordingly, an address (logical address) of user data, which is recognized by the host 2000, may be different from an address (physical address) of user data stored in the non-volatile memory 1200, and the physical address may be changed by the memory controller 1100.

The memory controller 1100 may manage the mapping information 1210 indicating a relationship between the logical and physical addresses of one user data. For example, the host 2000 may transmit the logical address of the user data to the non-volatile memory system 1000, and the memory controller 1100 of the non-volatile memory system 1000 may extract the physical address corresponding to the logical address based on the mapping information 1210, write or read data in a space designated by the physical address, and respond to a command of the host 2000.

In addition, the logical-physical address mapping information 1210 may be changed due to other causes. For example, as the number of times non-volatile cells included in the non-volatile memory 1200 program or erase data may be finite, to increase the lifespan of the non-volatile memory system 1000, the memory controller 1100 may change mapping information 1210 and prevent a specific portion of the non-volatile memory 1200 from being repetitively programmed or erased. For example, a physical address corresponding to a logical address may be changed to ensure, to the greatest extent possible, that all cells are programmed or erased to the same extent (e.g., the same amount of times). This operation of the memory controller 1100 may be referred to as a wear-levelling operation. Furthermore, the mapping information 1210 may be changed due to a garbage collection operation of the memory controller 1100.

The mapping information 1210 should be retained even when power supplied to the host 2000 or the non-volatile memory system 1000 is interrupted. Thus, as shown in FIG. 1, the mapping information 1210 may be stored in the non-volatile memory 1200 along with the user data. Also, the non-volatile memory system 1000 may include the mapping information storage unit 1300, and at least a portion of the mapping information 1210 stored in the non-volatile memory 1200 may be stored in the mapping information storage unit 1300 during the operation of the non-volatile memory system 1000. The mapping information 1210 stored in the non-volatile memory 1200 may include a mapping information group including at least one piece of mapping information regarding user data, and the memory controller 1100 may copy the mapping information group to the mapping information storage unit 1300.

In an embodiment of the inventive concept, the host 2000 may store size information 2010 regarding the mapping information group copied by the memory controller 1100 of the non-volatile memory system 1000 from the non-volatile memory 1200 to the mapping information storage unit 1300. To this end, the memory controller 1100 may transmit the size information 2010 regarding the mapping information group to the host 2000, and the host 2000 may store the size information 2010 regarding the mapping information group, which is received from the non-volatile memory system 1000. The host 2000 may communicate with the non-volatile memory system 1000 with reference to the size information 2010 regarding the mapping information group. A more detailed description of this behaviour is presented below.

A host or host device may be a system configured to communicate with a non-volatile memory system, and a host system may be a system including a host or a system including a host and a non-volatile memory system.

The non-volatile memory 1200 may include cells capable of retaining stored data even if power supply is interrupted. The non-volatile memory 1200 may include, for example, NAND or NOR flash memory cells, magnetic random access memory (MRAM) cells, resistive RAM (RRAM) cells, ferroelectric RAM (FRAM) cells, or phase-change memory (PCM) cells.

A non-volatile memory may be defined as a memory including peripheral circuits (e.g., a row decoder and a column decoder) configured to write or read data to and from non-volatile cells. A non-volatile memory device may be a device including a non-volatile memory or a device including a non-volatile memory and a memory controller.

Figure 2:
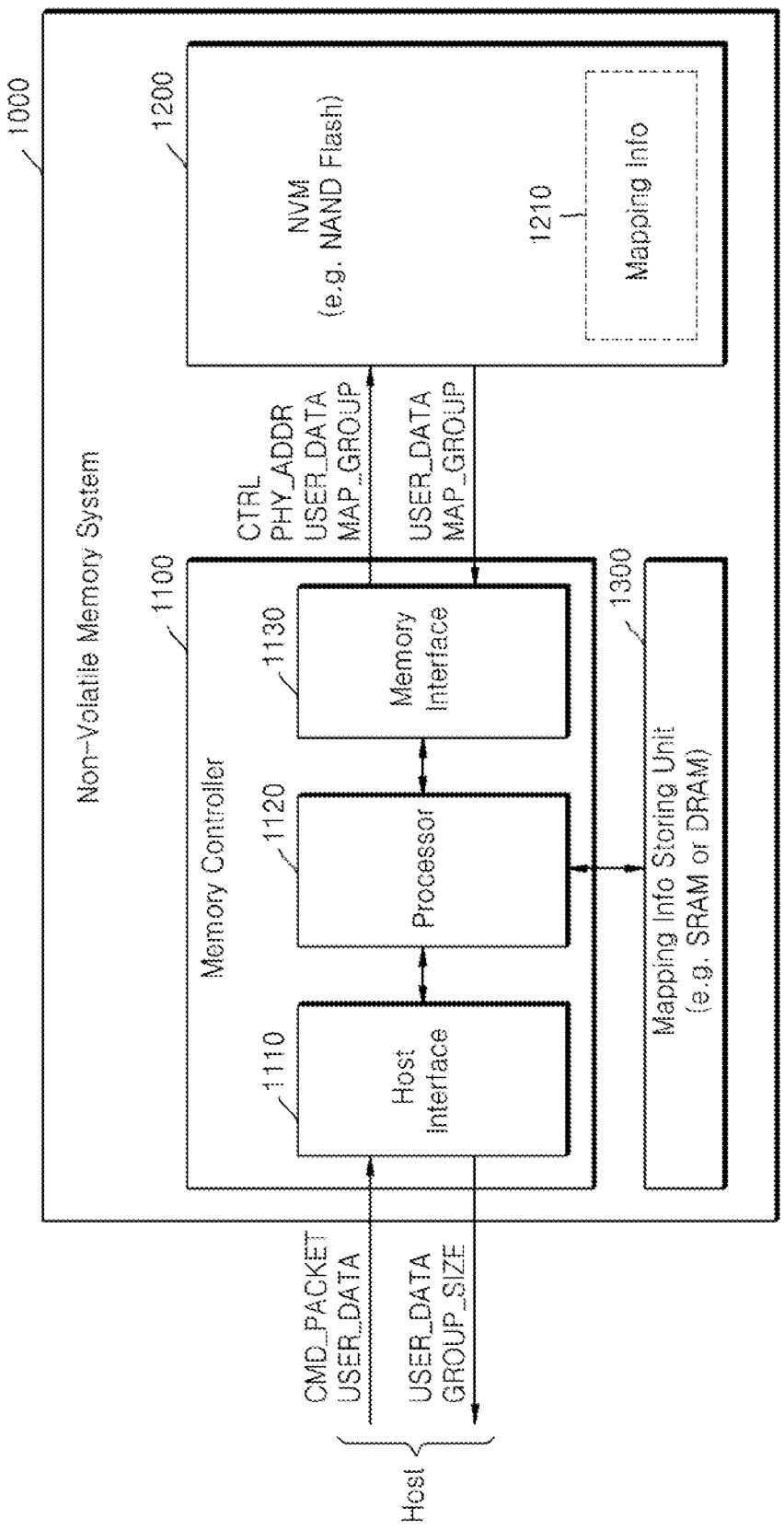
FIG. 2 is a diagram of an example of a memory controller of FIG. 1, according to exemplary embodiments of the inventive concept.

FIG. 2 is a diagram of an example of the memory controller 1100 of FIG. 1, according to exemplary embodiments of the inventive concept. The non-volatile memory system 1000 of FIG. 1 may include the memory controller 1100, which may receive various commands from the host 2000 and perform required operations on the non-volatile memory 1200 in response to the commands. As shown in FIG. 2, the memory controller 1100 may include a host interface 1110, a processor 1120, and a memory interface 1130.

The host interface 1110 may receive a command packet CMD_PACKET and user data USER_DATA from the host 2000 of FIG. 1 and transmit, back to the host, the user data USER_DATA and size information GROUP_SIZE regarding the mapping information group. Signals transmitted and received between the host 2000 and the non-volatile memory system 1000 are not limited to signals shown in FIG. 2, and other signals may be transmitted and received therebetween. The host interface 1110 may communicate with the host device 2000 through a predetermined protocol. For example, the protocol may be an embedded multimedia card (eMMC) or secure digital (SD) protocol, a serial advanced technology attachment (SATA), a serial attached small computer systems interface (SCSI) (SAS), a non-volatile memory express (NVMe), or a universal serial bus (USB).

The command packet CMD_PACKET received by the host interface 1110 from the host 2000 may include at least one command. For example, the command packet CMD_PACKET may include a command to write the user data USER_DATA, a command to read the user data USER_DATA, a command to request state information regarding the non-volatile memory system 1000, and a command to request the size information GROUP_SIZE regarding the mapping information group. Also, the command to write or read the user data USER_DATA may include a logical address of the user data USER_DATA.

The memory interface 1130 may transmit a control signal CTRL, a physical address PHY_ADDR, user data USER_DATA, and a mapping information group MAP_GROUP to the non-volatile memory 1200 and receive user data USER_DATA and a mapping information group MAP_GROUUP from the non-volatile memory 1200. Signals transmitted and received between the memory interface 1130 and the non-volatile memory 1200 are not limited to signals shown in FIG. 2, and other signals may be transmitted and received. The memory interface 1130 may transmit a control signal CTRL corresponding to the command from the host 2000 or corresponding to an operation (e.g., garbage collection) of the memory controller 1100 to the non-volatile memory 1200, and transmit the physical address PHY_ADDR or user data USER_DATA along with the control signal CTRL.

The processor 1120 may control the memory controller 1100 and transmit and receive required signals to and from the host 2000 and the non-volatile memory 1200 through the host interface 1110 and the memory interface 1130. The processor 1120 may write or change mapping information stored in the mapping information storage unit 1300. The processor 1120 may receive the mapping information 1210 stored in the non-volatile memory 1200 via the memory interface 1130 in units of mapping information groups, and store the received mapping information group in the mapping information storage unit 1300.

The mapping information storage unit 1300 may be embodied by a memory (e.g., a static random access memory (SRAM) or a dynamic RAM (DRAM)) having a higher response speed and a smaller storage capacity than the non-volatile memory 1200. The processor 1120 may take a comparatively long time to access the mapping information 1210 stored in the non-volatile memory 1200 via the memory interface 1130. Accordingly, the processor 1120 may copy a portion of the mapping information 1210 stored in the non-volatile memory 1200 to the mapping information storage unit 1300, make access to the mapping information stored in the mapping information storage unit 1300, and extract a physical address of user data.

When mapping information (or a mapping information group including the mapping information) corresponding to a logical address of user data is stored in the mapping information storage unit, the processor 1120 can directly obtain the mapping information regarding the user data from the mapping information storage unit. This event may be referred to as a hit. When mapping information (or a mapping information group including the mapping information) corresponding to a logical address of user data is not stored in the mapping information storage unit, the processor 1120 cannot directly obtain the mapping information regarding the user data from the mapping information storage unit. This event may be referred to as a miss.

When the miss occurs in the non-volatile memory system 1000, the processor 1120 may read a mapping information group including mapping information regarding user data from the non-volatile memory 1200 and copy the mapping information group to the mapping information storage unit 1300. Thus, when the miss occurs, it may take a longer time to access the user data than when the hit occurs. Accordingly, when a hit ratio increases, time taken to access the user data may be reduced. As a result, time taken for the non-volatile memory system 1000 to respond to the host 2000 may be reduced.

The processor 1120 may adopt a replacement algorithm of a typical cache memory, for example, a least recently used (LRU) algorithm, a most recently used (MRU) algorithm, and/or a least frequently used (LFU) algorithm.

In an embodiment, when the mapping information is copied from the non-volatile memory 1200 to the mapping information storage unit 1300, the processor 1120 may copy a mapping information group including mapping information regarding at least one user data to the mapping information storage unit 1300. During an initial operation of the non-volatile memory system 1000, the processor 1120 may transmit size information regarding the mapping information group to the host 2000.

In an embodiment, the processor 1120 may scramble or otherwise encrypt the size information regarding the mapping information group and transmit the scrambled size information regarding the mapping information group to the host 2000. The size information regarding the mapping information group, which is transmitted to the host 2000, may be scrambled and protected from interception by other electronic devices than the non-volatile memory system 1000 or the host 2000.

FIG. 3 is a diagram of a mapping information storage unit 1300 and a mapping information group according to exemplary embodiments of the inventive concept. The mapping information storage unit 1300 may store a plurality of pieces of mapping information, and the mapping information group may include at least one piece of mapping information. For example, as shown in FIG. 3, the mapping information storage unit 1300 may store ten pieces of mapping information, and the mapping information group may include ten pieces of mapping information. Accordingly, as shown in FIG. 3, the mapping information group may have a size of 10, and the mapping information storage unit 1300 may store one mapping information group.

Logical addresses of mapping information included in the mapping information groups may sequentially increase. For example, as shown in FIG. 3, Group 1 100 may include mapping information corresponding to logical addresses that sequentially increase from 11 to 20, Group 2 200 may include mapping information corresponding to logical addresses that sequentially increase from 21 to 30, and Group 3 300 may include mapping information corresponding to logical addresses that sequentially increase from 31 to 40.

Figure 4A:
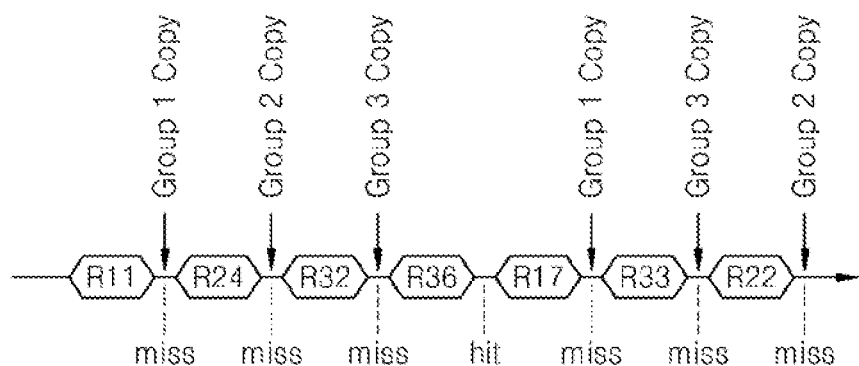
FIGS. 4A and 4B are diagrams illustrating the processing order of commands included in a command packet of a host in the mapping information storage unit and the mapping information groups of FIG. 3.
Figure 4B:
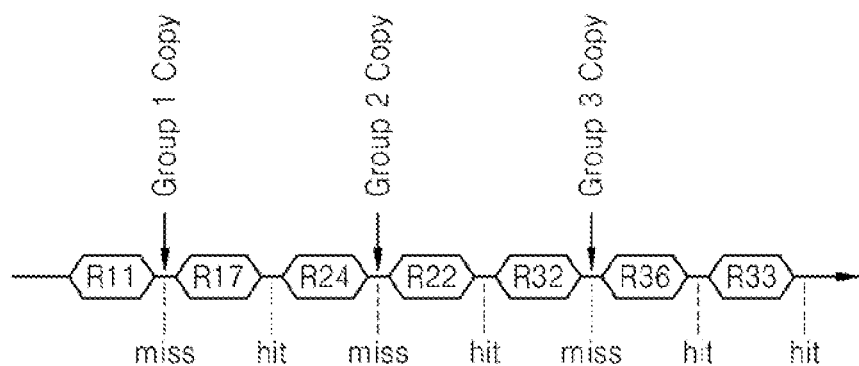

FIG. 4 is a diagram illustrating the processing order of commands included in a command packet of a host in the mapping information storage unit 1300 and the mapping information groups of FIG. 3. As described with reference to FIG. 2, the non-volatile memory system may receive a command packet CMD_PACKET from the host, and one command packet CMD_PACKET may include at least one command. For example, FIG. 4 shows two command packets CMD_PACKET in which the same commands are disposed in different orders. Commands included in the respective command packets CMD_PACKET may be commands R11, R24, R32, R36, R17, R33, and R22 to read different user data, and numbers included in the commands indicate logical addresses of the respective user data. It may be assumed that the mapping information storage unit 1300 of FIG. 3 does not store mapping information or stores mapping information groups other than Groups 1, 2, and 3 of FIG. 3 before the command packets CMD_PACKET of FIGS. 4A and 4B are received.

As shown in FIG. 4A, when the command R11 to read user data stored in a logical address #11 is transmitted to the processor included in the memory controller, the processor may ascertain whether mapping information regarding the logical address #11 (or a mapping information group including the mapping information regarding the logical address #11) is stored in the mapping information storage unit 1300. In light of the assumption made above, since an initial mapping information storage unit 1300 does not store the mapping information regarding the logical address #11 (or the mapping information group including the mapping information regarding the logical address #11), a miss may occur. Accordingly, the process may copy Group 1 of FIG. 3, which is the mapping information group including the mapping information regarding the logical address #11, from the non-volatile memory to the mapping information storage unit 1300.

As shown in FIG. 4A, after the command R11, the command R24 to read user data stored in a logical address #24 may be transmitted to the processor included in the memory controller. In this case, since the mapping information storage unit 1300 presently stores Group 1, a miss may occur. Accordingly, the processor may copy Group 2, which is a mapping information group including mapping information regarding the logical address #24, from the non-volatile memory to the mapping information storage unit 1300.

As shown in FIG. 4A, when the commands R32, R36, R17, R33, and R22 are sequentially transmitted to the processor included in the memory controller, one hit and four misses may occur in the same manner as described above. Accordingly, when the processor included in the memory controller receives the commands in the order shown in FIG. 4A, one hit and six misses may occur.

FIG. 4B shows a command packet in which commands are included in a different order from FIG. 4A. As shown in FIG. 4B, when the command R11 to read user data stored in the logical address #11 is transmitted to the processor included in the memory controller, the processor may ascertain whether mapping information regarding the logical address #11 (or a mapping information group including the mapping information regarding the logical address #11) is stored in the mapping information storage unit 1300. In light of the above assumption, since the initial mapping information storage unit 1300 does not store the mapping information regarding the logical address #11 (or the mapping information group including the mapping information regarding the logical address #11), a miss may occur. Accordingly, the processor may copy Group 1 of FIG. 3, which is the mapping information group including the mapping information regarding the logical address #11, from the non-volatile memory to the mapping information storage unit 1300.

As shown in FIG. 4B, after the command R11, the command R17 to read user data stored in a logical address #17 may be transmitted to the processor included in the memory controller. In this case, since the mapping information storage unit presently stores Group 1, a hit may occur. Since Group 1 includes mapping information regarding the logical address #17, the processor may access the mapping information regarding the logical address #17, which is stored in the mapping information storage unit 1300.

As shown in FIG. 4B, after the command R17, the command R24 to read user data stored in the logical address #24 may be transmitted to the processor included in the memory controller. In this case, since the mapping information storage 1300 stores Group 1, a miss may occur. The processor may copy Group 2, which is the mapping information group including the mapping information regarding the logical address #24, from the non-volatile memory to the mapping information storage unit.

As shown in FIG. 4B, when the commands R22, R32, R36, and R33 are sequentially transmitted to the processor included in the memory controller, three hits and one miss may occur in the same manner as described above. Accordingly, when the processor included in the memory controller receives the commands in the order shown in FIG. 4B, four hits and three misses may occur.

As shown in FIGS. 4A and 4B, a hit rate of the mapping information storage unit may increase according to the order of commands received from the host. When the processor included in the memory controller sequentially receives commands to process user data having mapping information belonging to the same mapping information group as shown in FIG. 4B, the number of hits may increase. Accordingly, when the commands included in the command packet transmitted by the host to the non-volatile memory system are disposed in the order shown in FIG. 4B, speed at which the non-volatile memory system responds to the commands may be increased more than in the case shown in FIG. 4A. The non-volatile memory system may transmit size information regarding the mapping information group to the host at an initial operation so that the host can dispose commands in a predetermined order.

Figure 5:
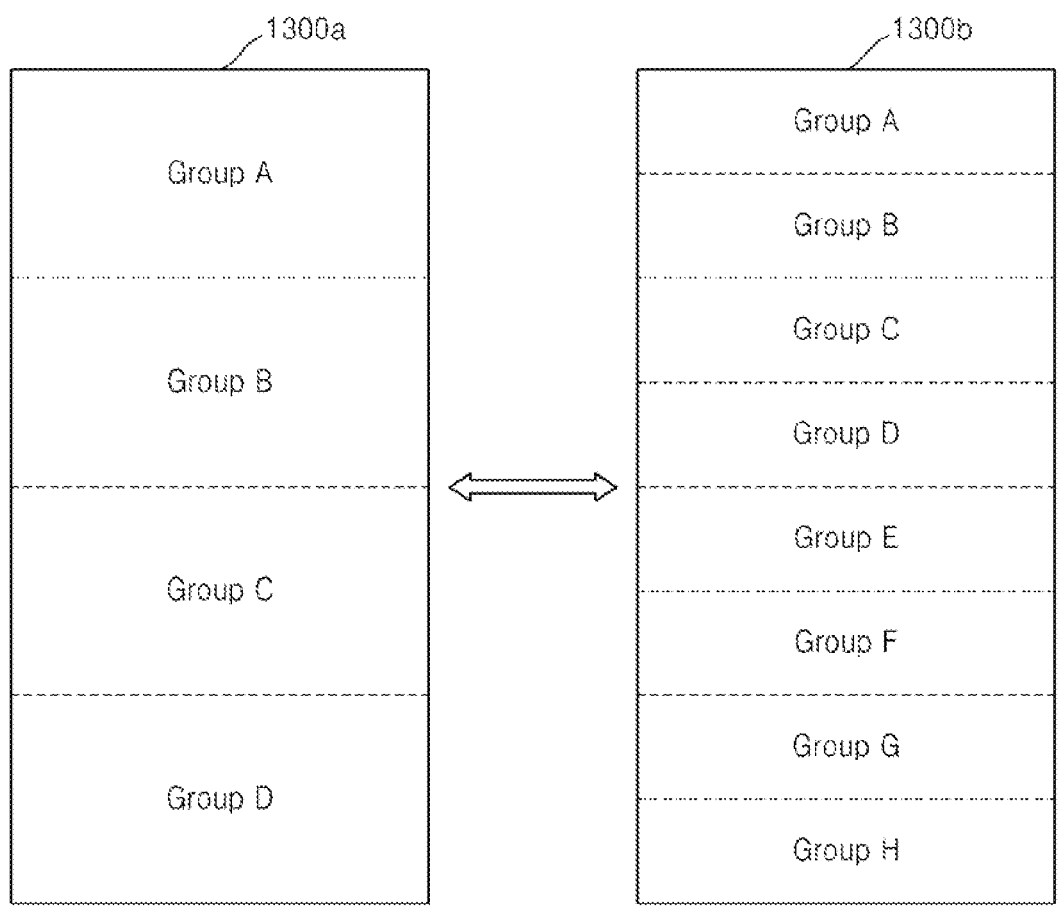
FIG. 5 is a diagram of an example of a mapping information storage unit according to exemplary embodiments of the inventive concept.

FIG. 5 is a diagram of an example of a mapping information storage unit according to exemplary embodiments of the inventive concept. Unlike the mapping information storage unit 1300 of FIG. 3 in which one mapping information group is stored, a mapping information storage unit may store two or more mapping information groups. For example, FIG. 5 shows a first mapping information storage unit 1300a configured to store four mapping information groups and a second mapping information storage unit 1300b configured to store eight mapping information groups.

The size of a mapping information group copied by a processor included in a memory controller from a non-volatile memory to the mapping information storage unit may be changed. For example, the processor included in the memory controller may receive a command to change the size of the mapping information group from a host, and copy a mapping information group with a changed size from the non-volatile memory to the mapping information storage unit. For example, as shown in FIG. 5, the mapping information storage unit may store four mapping information groups or store eight mapping information groups in response to a command received from the host. The mapping information storage units shown in FIGS. 3 and 5 are provided merely as examples, and the number of mapping information groups that may be stored in the mapping information storage unit is not limited to the examples shown in FIGS. 3 and 5.

In an embodiment, the command to change the size of the mapping information group, which is received by the processor included in the memory controller from the host, may be scrambled or otherwise encrypted. The processor may unscramble/decrypt the command to change the size of the mapping information group, which is received from the host, and copy the mapping information group with a changed size from the non-volatile memory to the mapping information storage unit.

Figure 6:
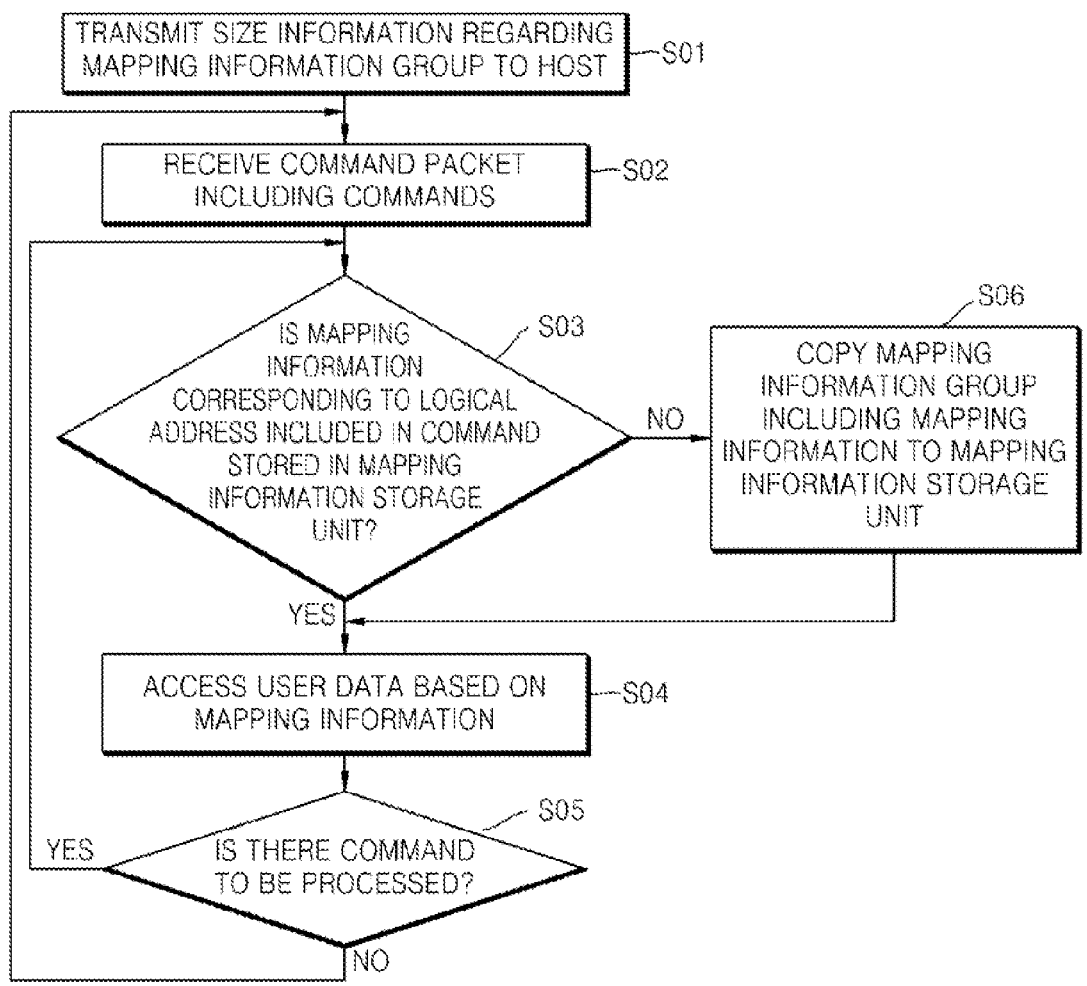
FIG. 6 is a flowchart illustrating an operation of a non-volatile memory system according to exemplary embodiments of the inventive concept.

FIG. 6 is a flowchart of an operation of a non-volatile memory system according to exemplary embodiments of the inventive concept. At an initial operation, the non-volatile memory system may transmit size information regarding a mapping information group to a host (operation S01). When the non-volatile memory system receives a command to require size information regarding the mapping information group from the host, the non-volatile memory system may transmit the size information regarding the mapping information group to the host. The host may dispose the order of commands included in a command packet CMD_PACKET using the size information regarding the mapping information group, which is received from the non-volatile memory system, and transmit the command packet CMD_PACKET to the non-volatile memory system.

The non-volatile memory system may receive the command packet CMD_PACKET including the commands from the host (operation S02). As described with reference to FIG. 2, the non-volatile memory system may include a memory controller and a mapping information storage unit, and the memory controller may include a processor. The processor included in the memory controller may sequentially process the commands belonging to the command packet CMD_PACKET. Furthermore, when a command is a command to process user data, the processor may ascertain whether mapping information (or a mapping information group including the mapping information) corresponding to a logical address of the user data is stored in the mapping information storage unit (operation S03). For example, the processor may ascertain whether the mapping information (or the mapping information group including the mapping information) regarding the user data is stored in the mapping information storage unit based on the logical address of the user data received from the host along with the command.

When the mapping information corresponding to the logical address of the user data corresponding to the command received from the host is not stored in the mapping information storage unit (No, S03), the processor may copy the mapping information group including the mapping information corresponding to the logical address of the user data from the non-volatile memory to the mapping information storage unit (operation S06). In this case, a mapping information group to be replaced with a mapping information group read from the non-volatile memory in the mapping information storage unit may be determined using an arbitrary replacement algorithm. For example, by means of an LRU replacement algorithm, the mapping information group to be replaced with the mapping information group read from the non-volatile memory may be a mapping information group that is least recently accessed from among mapping information groups stored in the mapping information storage unit.

When the mapping information corresponding to the logical address of the user data corresponding to the command received from the host is stored in the mapping information storage unit (Yes, S03) or after the mapping information is copied form the non-volatile memory to the mapping information storage unit (operation S06), the processor may make access to the user data based on the mapping information (operation S04). For example, when the command received from the host is a command to read the user data and the mapping information regarding the user data is stored in the mapping information storage unit, the processor may read the mapping information regarding the user data from the mapping information storage unit, and extract a physical address of the user data from the mapping information. The processor may read user data stored in a space of the non-volatile memory, which is designated by the physical address, via a memory interface, and transmit the read user data to the host via a host interface.

After processing one command, the processor may determine whether there is the next command to be processed (operation S05). When the processor processes all commands included in the command packet received from the host and there is no command to be processed (No, S05), the non-volatile memory system may receive a command packet including commands from the host (operation S02). In contrast, when there are the remaining commands to be processed (Yes, S05), the processer may start processing the next command and simultaneously determine whether mapping information corresponding to a logical address of user data corresponding to the command is stored in the mapping information storage unit (operation S03).

Figure 7:
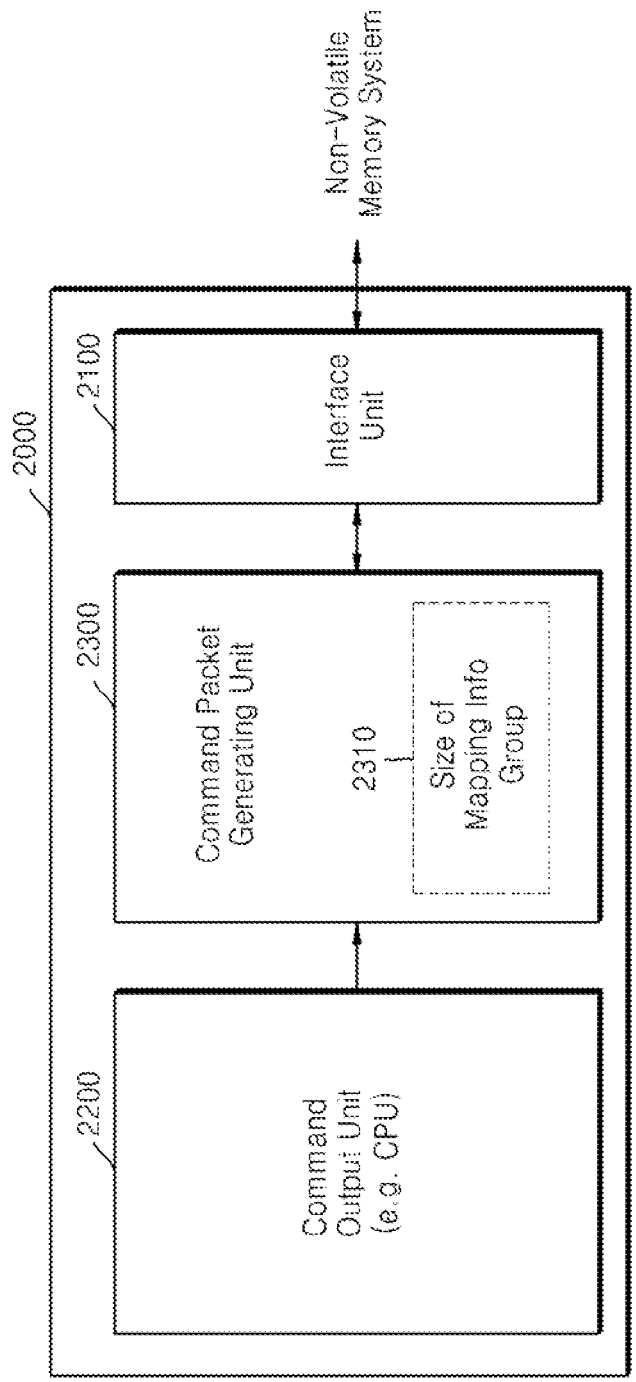
FIG. 7 is a block diagram of an example of the host of FIG. 1, according to exemplary embodiments of the inventive concept.

FIG. 7 is a block diagram of an example of the host of FIG. 1, according to exemplary embodiments of the inventive concept. A host 2000 configured to communicate with the non-volatile memory system 1000 of FIG. 1 and write or read user data may include an interface unit 2100, a command output unit 2200, and a command packet generating unit 2300. As described with reference to FIG. 1, the host 2000 may receive and store size information regarding a mapping information group, which is copied by a processor included in a memory controller of the non-volatile memory system 1000 from a non-volatile memory to a mapping information storage unit, from the non-volatile memory system 1000.

The interface unit 2100 may transmit a command packet, which may be sent to the non-volatile memory system 1000. The command packet may be formed in accordance with any predetermined transfer protocol and may include a command generated by the command packet generating unit 2300. A command packet may also be used to send user data from the non-volatile memory system 1000 to the interface unit 2100. For example, the protocol may be an eMMC or SD protocol, a SATA, a SAS, an NVMe, or a USB.

The command packet generating unit 2300 may receive a plurality of commands output by the command output unit 2200 and generate a command packet including the plurality of commands. Also, the command packet generating unit 2300 may receive and store the size information regarding the mapping information group from the non-volatile memory system 1000. The command packet generating unit 2300 may determine the order of commands received from the command output unit 2200, based on the stored size information regarding the mapping information group, and generate a command packet in which commands are disposed in the determined order.

In an embodiment, the command packet generating unit 2300 may receive scrambled or otherwise encrypted size information regarding the mapping information group from the non-volatile memory system 1000. The command packet generating unit 2300 may unscramble/decrypt and store the unscrambled/decrypted size information regarding the mapping information group.

The command output unit 2200 may output a command for the non-volatile memory system 1000. For example, the command output unit 2200 may output a command to write user data, a command to read the user data, a command to require state information regarding the non-volatile memory system 1000, and/or a command to request size information regarding the mapping information group.

In an embodiment, the command output unit 2200 may output a command to change the size of the mapping information group of the non-volatile memory system. The command output unit 2200 may output the command to change the size of the mapping information group according to a tendency to access the user data. For example, to read or write user data corresponding to adjacent logical addresses, a hit rate of user data may be increased when a mapping information group has a relatively large size. Meanwhile, to continuously read or write a small amount of user data corresponding to separate logical addresses, when a mapping information group has a relatively small size, the number of pieces of mapping information copied from the non-volatile memory to the mapping information storage unit may be reduced, thereby increasing the speed at which the non-volatile memory system responds to commands from the host.

In an embodiment, the command output unit 2200 may be included in a central processing unit (CPU) configured to control the entire host. The CPU may perform operations on data to control the host, and generate commands to transmit and receive data to and from peripheral devices (e.g., the non-volatile memory system).

In an embodiment, when the command packet generating unit 2300 receives a command to change the size of a mapping information group form the command output unit 2200, the command packet generating unit 2300 may scramble or otherwise encrypt the command to change the size of the mapping information group, and transmit the scrambled/encrypted command via the interface unit 2100 to the non-volatile memory system.

Figure 8:
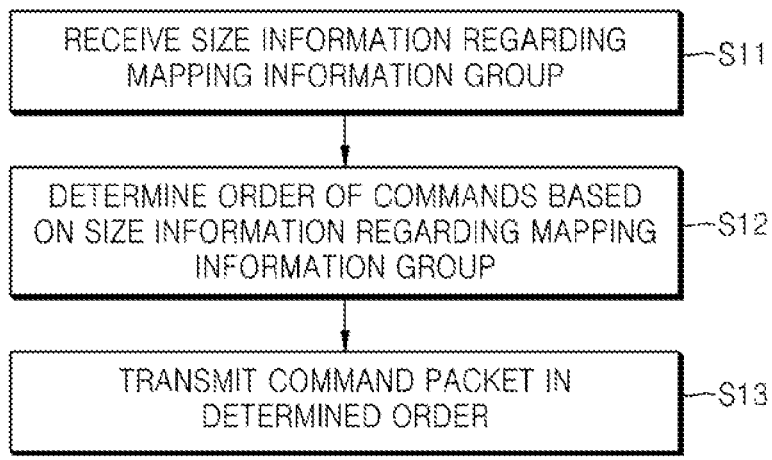
FIG. 8 is a flowchart illustrating an operation of a host according to exemplary embodiments of the inventive concept.

FIG. 8 is a flowchart illustrating an operation of a host according to embodiments of the inventive concept. The host may receive size information regarding a mapping information group from a non-volatile memory system (operation S11). The host may determine the order of commands received from a command output unit based on the size information of the mapping information group (operation S12). For example, a command packet generating unit included in the host may determine the order of the commands so as to sequentially access user data having mapping information belonging to the same mapping information group, based on logical addresses of the user data, and generate a command packet in which the commands are disposed in the determined order. The host may transmit the generated command packet to the non-volatile memory system (operation S13), and wait for a response from the non-volatile memory device.

Figure 9:
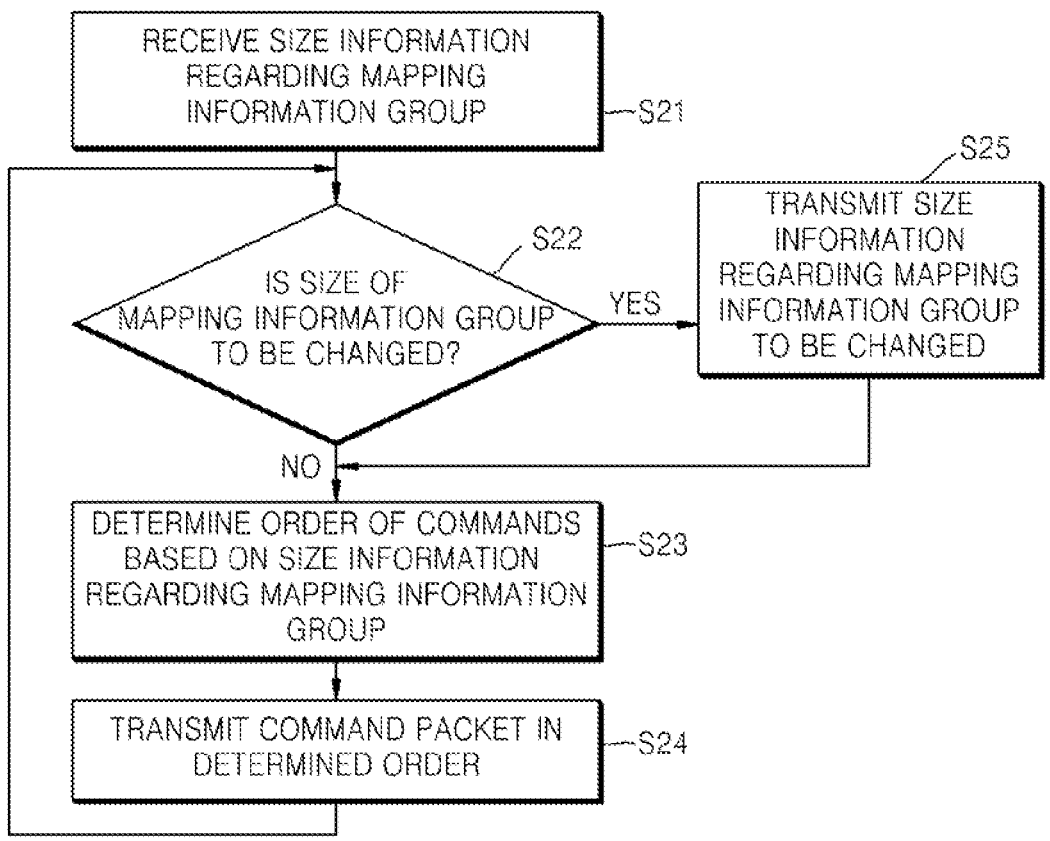
FIG. 9 is a flowchart illustrating an operation of a host according to exemplary embodiments of the inventive concept.

FIG. 9 is a flowchart illustrating an operation of a host according to an embodiment of the inventive concept. At an initial operation, the host may receive size information regarding a mapping information group from a non-volatile memory system (operation S21). The host may determine whether the size of the mapping information group received from the non-volatile memory system is appropriate for a tendency for the host to access user data, and determine whether the size of the mapping information group of the non-volatile memory system is to be changed (operation S22).

When the size of the mapping information group of the non-volatile memory system is not appropriate for the tendency for the host to access the user data, and thus the size of the mapping information group of the non-volatile memory is to be changed (Yes, S22), the host may transmit size information regarding the mapping information group to be changed to the non-volatile memory system (operation S25). The non-volatile memory system may receive new size information regarding to a mapping information group from the host, and mapping information corresponding to the received size of the mapping information group may be copied from the non-volatile memory included in the non-volatile memory system to the mapping information storing unit. Alternatively, when the size of the mapping information group of the non-volatile memory system is appropriate for the tendency for the host to access the user data, and thus the size of the mapping information group of the non-volatile memory need not be changed (No, S22), the step of transmitting the size information (Step S25) may be avoided.

The host may determine the order of commands belonging to a command packet which are transmitted to the non-volatile memory system based on size information regarding the mapping information group (operation S23). For example, a command packet generating unit included in the host may determine the order of commands so as to sequentially access user data having mapping information belonging to the same mapping information group, based on logical addresses of the user data, and generate a command packet in which the commands are disposed in the determined order. The host may transmit the generated command packet to the non-volatile memory system (operation S24) and wait for a response from the non-volatile memory system. When the host receives the response from the non-volatile memory, the host may determine whether or not the size of the mapping information group is to be changed again (operation S22).

Figure 10:
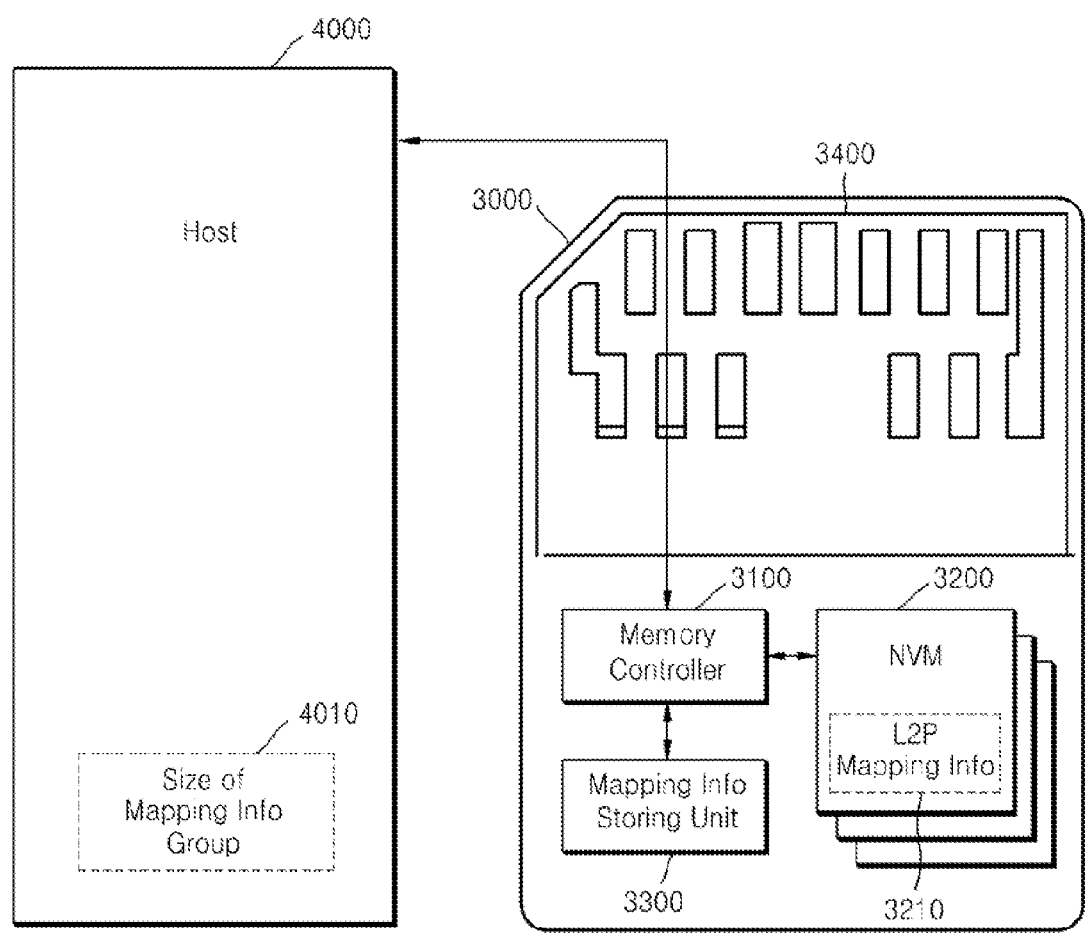
FIG. 10 is a schematic diagram of a memory card and a host according to exemplary embodiments of the inventive concept.

FIG. 10 is a schematic diagram of a memory card and a host according to exemplary embodiments of the inventive concept. The non-volatile memory systems described above may be embodied as a memory card 3000. For example, the memory card 3000 may include an eMMC or an SD card. As shown in FIG. 10, the memory card 3000 may include a memory controller 3100, a non-volatile memory 3200, and a mapping information storing unit 3300.

The non-volatile memory 3200 may include cells capable of retaining stored data even when power supply is interrupted. For example, the non-volatile memory 3200 may be a flash memory, an MRAM, an RRAM, an FRAM, or a PCM. The memory controller 3100 may perform operations according to the above-described approaches. The memory controller 3100 may copy a mapping information group included in mapping information 3210 stored in the non-volatile memory 3200 to the mapping information storage unit 3300. The mapping information storage unit 3300 may be embodied by a memory having a higher response speed than the non-volatile memory 3200 and include, for example, an SRAM cell array or a DRAM cell array. The memory controller 3100 may communicate with a host 4000 through a port region 3400 according to a predetermined protocol. The protocol may be an eMMC or SD protocol, a SATA, a SAS, or a USB.

The host 4000 may store size information 4010 regarding the mapping information group of the memory card 3000. As in the foregoing embodiments, the host 4000 may receive and store the size information regarding the mapping information group from the memory card 3000 and transmit a command packet in which the order of commands to be given to the memory card 3000 based on the size information 4010 regarding the mapping information group.

Figure 11:
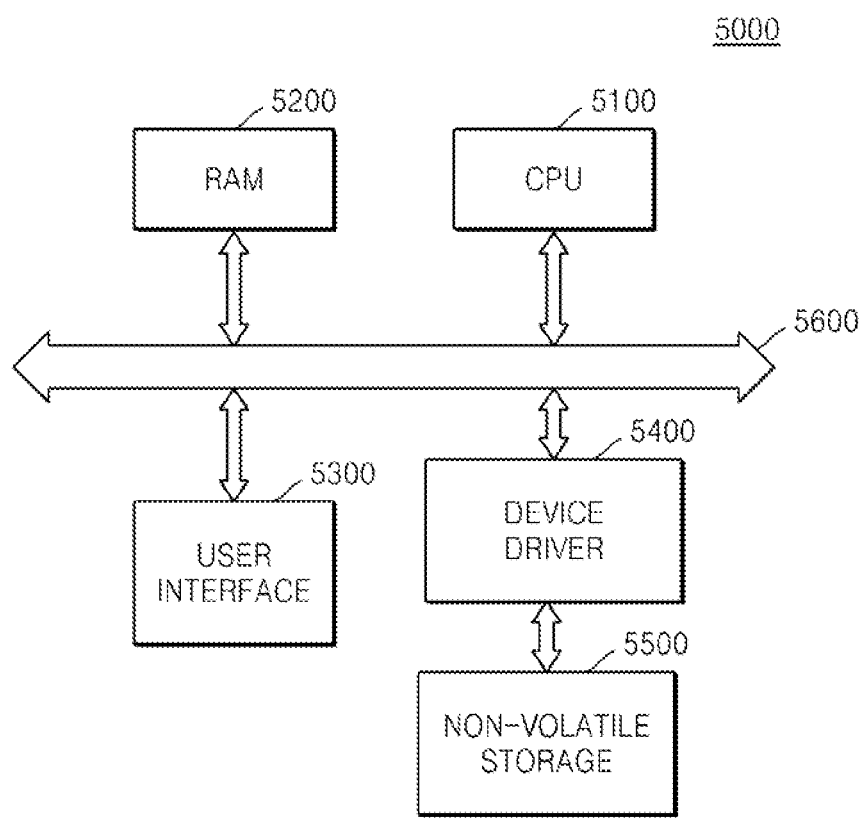
FIG. 11 is a block diagram of a computing system including a non-volatile storage device and a host according to exemplary embodiments of the inventive concept.

FIG. 11 is a block diagram of a computing system 5000 including a non-volatile storage device and a host according to exemplary embodiments of the inventive concept. When the computing system 5000 is a mobile device or a desktop computer, a non-volatile storage 5500 may be mounted as a non-volatile memory system according to the inventive concept.

The computing system 5000 according to exemplary embodiments may include a central processing unit (CPU) 5100, a random access memory (RAM) 5200, a user interface 5300, and a device driver 5400, each of which may be electrically connected to a bus 5600. The non-volatile storage 5500 may be connected to the device driver 5400. In the computing system 5000 of FIG. 11, a host, for example, such as is described above may include the CPU 5100, the RAM 5200, the user interface 530, and the device driver 5400. The CPU 5100 may control the entire computing system 5000 and perform operations corresponding to commands input by a user via the user interface 5300. The RAM 5200 may function as a data memory of the CPU 5100, and the CPU 5100 may write or read user data in or from the non-volatile storage 5500 through the device driver 5400.

As described above, the device driver 5400 may include a command packet generating unit and an interface unit. The command packet generating unit of the device driver 5400 may receive a plurality of commands from the CPU 5100 via the bus 5600. The command packet generating unit of the device driver 5400 may communicate with the non-volatile storage 5500 via the interface unit and receive and store mapping group size information of the non-volatile storage 5500.

As in the foregoing embodiments, the non-volatile storage 5500 may include a memory controller, a non-volatile memory, and a mapping information storage unit. The memory controller of the non-volatile storage 5500 may control the entire non-volatile storage 5500, and communicate with the device driver 5400. The memory controller of the non-volatile storage 5500 may be any one of the above-described memory controllers of the non-volatile memory systems. The non-volatile memory of the non-volatile storage 5500 may include a memory capable of retaining stored data even when power supply is interrupted. The mapping information storage unit of the non-volatile storage 5500 may include at least portion of mapping information stored in the non-volatile memory.

While the inventive concept has been particularly shown and described with reference to exemplary embodiments thereof, it will be understood that various changes in form and details may be made therein without departing from the spirit and scope of the disclosure.

What is claimed is:

1. A non-volatile memory system comprising:
   a non-volatile memory configured to store user data and a plurality of mapping data groups, the mapping data groups including mapping information mapping between a logical address and a physical address of the user data;
   a mapping information storage unit configured to store at least one of the mapping data groups; and
   a memory controller configured to transmit size information regarding the size of the mapping data groups to a host device that is in communication with the non-volatile memory system and copy a requested mapping data group, of the plurality of mapping data groups, including mapping information regarding data requested by the host device to be accessed from the non-volatile memory to the mapping information storage unit,
   wherein the host device is external with respect to the non-volatile memory system.

2. The system of claim 1, wherein each of the mapping data groups of the plurality of mapping data groups includes mapping information corresponding to a predetermined number of logical addresses that sequentially increase.

3. The system of claim 1, wherein the memory controller receives a command packet including a plurality of commands to access requested user data, from the host device, and provides access to the data according to an order of the commands included in the command packet.

4. The system of claim 1, wherein the memory controller scrambles or otherwise encrypts the size information regarding the requested mapping data group and transmits the scrambled or otherwise encrypted size information to the host device.

5. The system of claim 1, wherein the memory controller receives a command to change a size of the mapping data group, from the host device, and changes the size of the requested mapping data group copied from the non-volatile memory to the mapping information storage unit.

6. The system of claim 5, wherein the command to change the size of the mapping data group is scrambled or otherwise encrypted, and the memory controller unscrambles/decrypts the scrambled or otherwise encrypted command and changes the size of the mapping data group copied from the non-volatile memory to the mapping information storage unit.

7. The system of claim 1, wherein the non-volatile memory is a NAND flash memory.

8. The system of claim 1, wherein the system is a multimedia card (MMC) or an embedded multimedia card (eMMC).

9. A host system comprising:

an interface unit configured to communicate with a non-volatile memory system that is in communication with, and external with respect to, the host system, the non-volatile memory system configured to store a plurality of mapping data groups including mapping information mapping between logical addresses of user data and physical addresses of the user data within the host system;

a command output unit configured to output at least one command to access the user data; and a command packet generating unit configured to receive a plurality of commands from the command output unit, determine an order of the plurality of commands based on size information regarding the plurality of mapping data groups to generate a command packet, and transmit the command packet to the non-volatile memory system via the interface unit.

10. The host of claim 9, wherein each of the plurality of mapping data groups includes mapping information corresponding to a predetermined number of logical addresses that sequentially increase.

11. The host of claim 9, wherein the command packet generating unit determines the order of commands belonging to the command packet such that data corresponding to logical addresses belonging to the same mapping data group are sequentially accessed.

12. The host of claim 9, wherein the command output unit is included in a central processing unit (CPU) of the host.

13. The host of claim 12, wherein the command output unit outputs a command to change the size of the mapping data group of the non-volatile memory system.

14. The host of claim 9, wherein size information regarding the mapping data group received from the non-volatile memory system is scrambled or otherwise encrypted, and the command packet generating unit unscrambles/decrypts and stores the scrambled or otherwise encrypted size information regarding the mapping data group.

15. The host of claim 9, wherein the interface unit supports an MMC or an eMMC protocol.

16. A non-volatile memory system comprising:

a non-volatile memory configured to store user data and mapping data for mapping between a logical address and a physical address of the user data stored in the non-volatile memory; and a mapping data cache unit configured to store a copy of at least some of the mapping data stored in the non-volatile memory, wherein the non-volatile memory system is configured to send to a host device that is in communication with the non-volatile memory system, size information indicating a size of the at least some of the mapping data stored in the mapping data cache, and wherein an order in which the host device sends commands to the non-volatile memory system is depended upon the sent size information, wherein the host device is external with respect to the non-volatile memory system.

17. The system of claim 16, wherein the mapping data stored in the mapping data cache corresponds to a predetermined sequence of logical addresses.

18. The system of claim 16, wherein the size information sent to the host device is encrypted prior to transmission.

19. The system of claim 16, wherein the non-volatile memory system is configured to change the size of the mapping data stored in the non-volatile memory in response to a request from the host device.

20. The system of claim 19, wherein the request from the host device to change the size of the mapping data stored in the non-volatile memory is encrypted and the non-volatile memory system is configured to decrypt the encrypted request.

* * * * *